Jan. 26, 1960  C. Q. MARTIN  2,922,326
HAND TOOL STRAIGHTENER FOR SICKLE-BAR GUARDS
Filed June 6, 1958
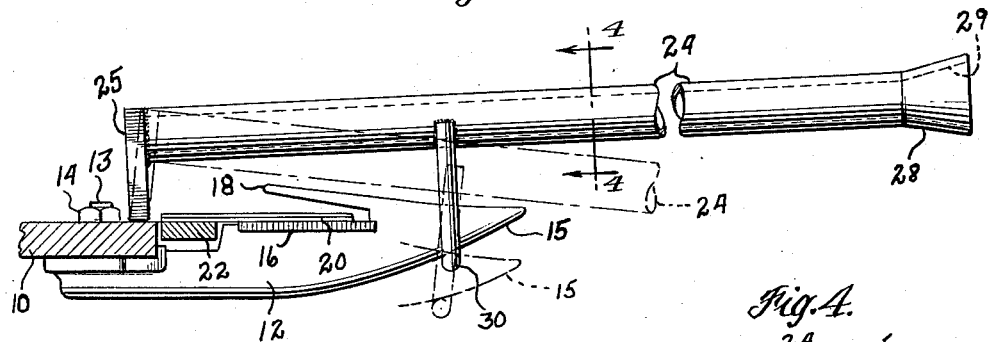
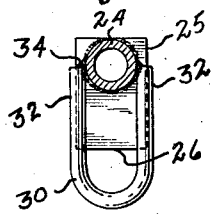
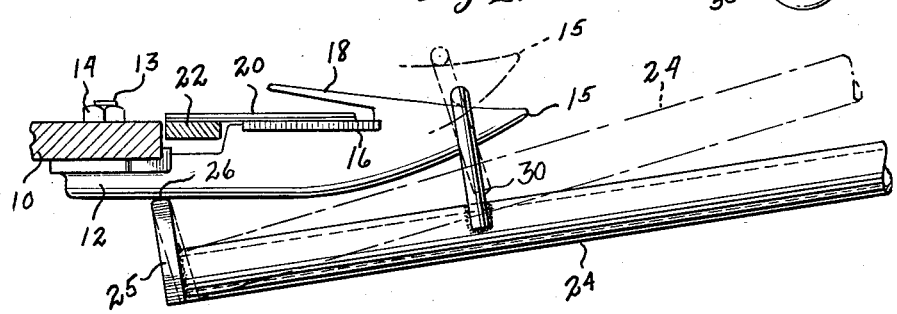
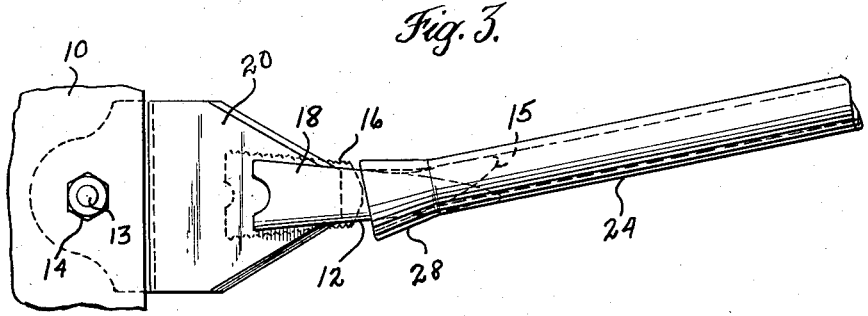
INVENTOR
Charles Q. Martin
Joseph Allen Brown
ATTORNEY

United States Patent Office 2,922,326
Patented Jan. 26, 1960

2,922,326

HAND TOOL STRAIGHTENER FOR SICKLE-BAR GUARDS

Charles Q. Martin, Leola, Pa., assignor to Sperry Rand Corporation, New Holland, Pa., a corporation of Delaware Application June 6, 1958, Serial No. 740,253

1 Claim. (Cl. 81—15)

The present invention relates generally to tools and more particularly to bending tools. Still more specifically, the invention relates to a tool for straightening bent, tapered, forward ends of sickle knife finger guards on a reciprocable mower.

A conventional reciprocable mower, as shown for example in U.S. Patent No. 2,786,319, has a cutter bar which extends transversely relative to the direction of travel when the mower is operating normally. Projecting forwardly of the cutter bar are guard fingers, each of which carries a fixed knife section. Cooperative therewith is a reciprocable sickle knife. The guard fingers direct the standing crop material to the sickle knife and protect the rearwardly disposed structure from damage. However, when the mower is used, one or more of the finger guards may come into contact with a rock, stump or other obstruction and become bent. A guard finger should be straightened promptly if it becomes bent because proper alignment of the guard fingers on a mower is essential to achieving a good shearing action of the sickle knife. Further, properly aligned guard fingers provide a longer operative life for the fingers themselves and the knife assembly which they protect.

Heretofore, it has been practiced to hammer bent guard fingers to straighten and realign them relative to the mower cutter bar and the other unbent fingers. Hammering, while effective, is undesirable since impact forces are transmitted through the guard fingers to the knife assembly. This may cause damage.

Generally, when the forward ends of guard fingers become bent, they are bent either upwardly or downwardly upon hitting an obstruction. However, there are times when the guards are bent laterally.

One object of this invention is to provide a simple tool for straightening bent guard fingers in a reciprocable mower, such tool being reversible whereby a guard finger may be straightened regardless of the direction in which it is bent.

Another object of this invention is to provide a tool of the character described having one end which is useable to bend a guard finger upwardly or downwardly, and an opposite end of which is useable to bend a guard finger laterally.

A further object of this invention is to provide a tool of the character described which has few parts of simple design, easily manufactured and assembled.

Other objects of this invention will be apparent hereinafter from the specification and from the recital in the appended claim.

In the drawing:

Fig. 1 is a fragmentary side elevation showing a tool constructed according to this invention disposed in operative relationship to a mower and a guard finger thereon, for bending the finger upwardly;

Fig. 2 is a view similar to Fig. 1 showing the tool in another operative position, namely, for bending a guard finger downwardly;

Fig. 3 is a plan view showing the tool reversed and being used for lateral adjustment of the tip of a guard finger; and Fig. 4 is a section taken on the line 4—4 of Fig. 1 and looking in the direction of the arrows.

Referring now to the drawing by numerals of reference, 10 denotes a fixed cutter bar having a plurality of guard fingers, one of which is shown at 12. Guard finger 12 is connected to the cutter bar by a bolt 13 and nut 14. The finger has a forwardly directed tapered end 15. A fixed knife section or ledger plate 16 is carried on the guard finger and overlying the ledger plate is an upwardly and rearwardly projecting portion 18 of the guard finger. Cooperating with knife section 16 is an element 20 of a sickle knife connected to a reciprocable sickle bar 22 driven from a source of power, not shown.

In order to straighten guard finger 12 after it has been bent, and particularly the forward end 15 of the finger, the tool of this invention is provided. Such tool comprises an elongate, straight, tubular, lever arm 24 having a pivot foot or plate 25 welded to one end. Foot 25 projects radially of the lever arm, having a pivot edge 26.

The opposite end of lever 24 has a funnel shaped handle 28 having a tapered bore 29. The tapering is generally the same as the taper on guard finger 12 whereby the handle end of the lever may be slid over the end 15 of a mower guard.

Disposed medially on lever 24 is a fixed U-shaped hook 30 which extends in a plane transverse to the longitudinal axis of the lever and projects radially therefrom in the same direction as the foot 25. The legs 32 of hook 30 straddle lever 24 and are welded thereto at 34 as indicated in Fig. 4.

When a guard finger 12 has been bent downwardly as indicated by the dotted lines in Fig. 1, the guard can be straightened by applying the tool as shown. The lever arm is extended above the finger guard and hook 30 is slid over the forward tapered end 15. The pivot foot 25 is set so that the edge 26 rests upon the fixed cutter bar 10. By grasping handle 28 and lifting upwardly guard 12 may be bent readily to the solid line position shown in Fig. 1.

When guard finger 12 has hit an obstruction and is bent upwardly as indicated by the dotted lines in Fig. 2, it may be straightened by shifting the tool around from the position shown in Fig. 1 to the position shown in Fig. 2 so that the lever arm is below the guard finger. The pivot foot 25 is disposed to engage the bottom of the guard finger while the hook 30 is extended over the forward end of the finger. By grasping handle 28 and pivoting downwardly, the guard 12 may be bent back into shape.

When the tip of the guard finger has been bent laterally as shown in Fig. 3, the operator reverses the tool 24 and slides the handled end 28 over the tapered end 15 of the guard and exerts a lateral pivoting force on the guard to straighten it. The foot portion 25 of the tool then becomes the handle. When the guard is laterally straightened, the hook 30 is not utilized.

When guard finger 12 is bent upwardly or downwardly on hitting an obstruction, the bend usually occurs just forwardly of the bolt 13, or the point of least thickness of the finger. Thus knife segment 16 is moved toward or away from the sickle knife 20 and the shearing action is impaired. With the tool of this invention such impairment is quickly correctable.

The guard finger has greater resistance at its inner end to lateral bending than to up and down bending, thus when bent laterally it is usually only the forward tip which becomes bent. The funnel shaped handle 28 provides for this situation.

The bending tool thus described has a structure of utmost simplicity comprising merely the lever arm 24, pivot foot 25, hook 30 and handle 28. There are only three parts to the tool, all of the parts being connected by welding. While the tool is of simple construction and of extremely low cost, it nevertheless is useable to overcome a heretofore annoying task. Since the guard fingers 12 are straightened by bending, rather than hammering, there is no danger of damaging the sickle knife assembly.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claim.

Having thus described my invention, what I claim is:

A reversible tool for straightening bent, tapered sickle knife guards on a mower comprising a relatively straight, elongate, tubular lever, a pivot foot fixed to one end of said lever and projecting transversely therefrom, a handle at the opposite end of said lever, said handle having an opened, tapered bore the tapering of which is similar to the tapered ends of said sickle knife guards whereby said handle end of said lever may be slid over a guard and a straightening force applied thereto, and a hook affixed to said lever between said pivot foot and said handle and having legs straddling said lever, said hook projecting radially of said lever a greater distance than the projection of said pivot foot and extending in a fixed plane transverse to the longitudinal axis of the lever.

References Cited in the file of this patent

UNITED STATES PATENTS

| | | |
|---|---|---|
| 2,075,117 | Johnson | Mar. 30, 1937 |
| 2,616,317 | Hakkerup | Nov. 4, 1952 |
| 2,799,193 | Ferris | July 16, 1957 |
| 2,852,971 | Macaluso | Sept. 23, 1958 |

FOREIGN PATENTS

| | | |
|---|---|---|
| 600,171 | Great Britain | Apr. 1, 1948 |